United States Patent
Burton et al.

(10) Patent No.: US 7,143,122 B2
(45) Date of Patent: Nov. 28, 2006

(54) DATA REPLICATION IN DATA STORAGE SYSTEMS

(75) Inventors: David Alan Burton, Vail, AZ (US); Noel Simen Otterness, Lafayette, CO (US); Kurt Alan Shoens, Los Altos, CA (US)

(73) Assignee: Pillar Data Systems, Inc., San Jose, CA (US)

( * ) Notice: Subject to any disclaimer, the term of this patent is extended or adjusted under 35 U.S.C. 154(b) by 486 days.

(21) Appl. No.: 10/696,327

(22) Filed: Oct. 28, 2003

(65) Prior Publication Data

US 2005/0091391 A1 Apr. 28, 2005

(51) Int. Cl.
*G06F 17/30* (2006.01)

(52) U.S. Cl. .................. 707/204; 707/10; 707/101; 707/102; 707/103 R; 707/203; 709/232; 711/162; 714/6

(58) Field of Classification Search ............. 707/10, 707/100, 101, 204, 8, 103 R, 102, 202, 203; 711/162, 141, 118, 216; 714/5, 6; 709/232
See application file for complete search history.

(56) References Cited

U.S. PATENT DOCUMENTS

| | | | |
|---|---|---|---|
| 4,897,781 A | 1/1990 | Chang et al. | |
| 5,155,845 A * | 10/1992 | Beal et al. .................. | 714/6 |
| 5,544,347 A | 8/1996 | Yanai et al. | |
| 5,555,371 A | 9/1996 | Duyanovich et al. | |
| 5,577,222 A | 11/1996 | Micka et al. | |
| 5,592,618 A | 1/1997 | Micka et al. | |
| 5,594,900 A | 1/1997 | Cohn et al. | |
| 5,613,113 A | 3/1997 | Goldring | |
| 5,640,561 A | 6/1997 | Satoh et al. | |
| 5,682,513 A | 10/1997 | Candelaria et al. | |
| 5,689,706 A | 11/1997 | Rao et al. | |
| 5,720,029 A | 2/1998 | Kern et al. | |
| 5,889,935 A * | 3/1999 | Ofek et al. .................. | 714/6 |
| 5,901,327 A * | 5/1999 | Ofek .................. | 709/232 |
| 6,044,444 A * | 3/2000 | Ofek .................. | 711/162 |
| 6,052,797 A | 4/2000 | Ofek et al. | |
| 6,101,497 A | 8/2000 | Ofek | |
| 6,157,991 A | 12/2000 | Arnon | |
| 6,163,856 A | 12/2000 | Dion et al. | |
| 6,173,377 B1 * | 1/2001 | Yanai et al. .................. | 711/162 |
| 6,301,643 B1 | 10/2001 | Crockett et al. | |
| 6,335,931 B1 | 1/2002 | Strong et al. | |
| 6,415,292 B1 | 7/2002 | Kamvysselis | |
| 6,502,205 B1 * | 12/2002 | Yanai et al. .................. | 714/7 |
| 6,535,869 B1 | 3/2003 | Housel, III | |
| 6,601,187 B1 * | 7/2003 | Sicola et al. .................. | 714/6 |
| 6,772,178 B1 | 8/2004 | Mandal et al. | |
| 6,823,336 B1 * | 11/2004 | Srinivasan et al. .................. | 707/8 |
| 6,996,672 B1 * | 2/2006 | Lubbers et al. .................. | 711/114 |
| 7,039,660 B1 * | 5/2006 | Kitsuregawa et al. .................. | 707/204 |
| 2002/0133512 A1 | 9/2002 | Milillo et al. | |
| 2002/0194484 A1 | 12/2002 | Bolosky et al. | |

* cited by examiner

*Primary Examiner*—Shahid Al Alam
(74) *Attorney, Agent, or Firm*—Robert Moll

(57) ABSTRACT

The present invention relates to system and method of asynchronous data replication. In an embodiment, the system includes a primary host that asynchronously transmits write and sync commands where each write and sync command includes a data set ID and a sequence number. A secondary host coupled to the primary host receives the write and sync commands out of order, tracks receipt of write and sync commands, and after receipt of the write and sync commands of the data set writes blocks associated with the write commands to data storage coupled to the secondary host.

17 Claims, 13 Drawing Sheets

DATA REPLICATION IN DATA STORAGE SYSTEMS

BACKGROUND

The invention relates to data replication between primary and secondary data storage systems.

This application incorporates by reference herein as follows:

U.S. application Ser. No. 10/264,603, entitled, Systems and Methods of Multiple Access Paths to Single Ported Storage Devices, filed on Oct. 3, 2002;

U.S. application Ser. No. 10/354,797, Methods and Systems of Host Caching, filed on Jan. 29, 2003, now U.S. Pat. No. 6,965,979 B2;

U.S. application Ser. No. 10/397,610, Methods and Systems for Management of System Metadata, filed on Mar. 26, 2003;

U.S. application Ser. No. 10/440,347, Methods and Systems of Cache Memory Management and Snapshot Operations, filed on May 16, 2003;

U.S. application Ser. No. 10/600,417, Systems and Methods of Data Migration in Snapshot Operations, filed on Jun. 19, 2003;

U.S. application Ser. No. 10/616,128, Snapshots of File Systems in Data Storage Systems, filed on Jul. 8, 2003, and now U.S. Pat. No. 6,959,313 B2; and U.S. application Ser. No. 10/677,560, Systems and Methods of Multiple Access Paths to Single Ported Storage Devices, filed on Oct. 1, 2003.

Many enterprises require an extra copy of the data if the primary data storage system fails. Tape backup can provide the copy but is too slow for regular access to the data and is time consuming to restore to faster storage devices such as disk drives. Data replication provides a solution by transmitting a copy of the data from the storage devices of a primary data storage system to those of a secondary data storage system so that the data can be still quickly accessed when the primary data storage system fails.

High performance requires that a primary data storage system acknowledge a write command from an application before transmitting the write command to the secondary data storage system. This is referred to as asynchronous data replication. Asynchronous replication can result in the delivery of data at the secondary data storage system which is out of order with respect to the order in which the write commands were originally written by the application. When the secondary data storage system writes data out of order, the data may not match the copy at the primary data storage system.

The primary data storage system and the network (e.g. Fibre Channel) can inadvertently change the order of the data received at the secondary data storage system. A data replication system must somehow maintain a matching copy at the secondary data storage system. At the same time, data replication should keep the network busy between the primary and secondary data storage systems. Therefore, the primary data storage system should transmit write commands as soon as possible. However, many data replication systems will transmit the write commands in groups to keep the data in order resulting in inefficient use of the network.

SUMMARY OF THE INVENTION

The present invention relates to systems and methods of asynchronous data replication. In an embodiment, the system includes a primary host that asynchronously transmits write and sync commands where each write and sync command includes a data set ID and a sequence number. A secondary host coupled to the primary host receives the write and sync commands out of order, tracks receipt of write and sync commands, and after receipt of the write and sync commands of the data set writes blocks associated with the write commands to data storage coupled to the secondary host.

DETAILED DESCRIPTION OF THE PREFERRED EMBODIMENTS

The following description includes the best mode of carrying out the invention. It is made for the purpose of illustrating the general principles of the invention and should not be taken in a limiting sense. The scope of the invention is determined by reference to the claims. Each part is assigned its own part number throughout the specification and drawings.

Figure 1:
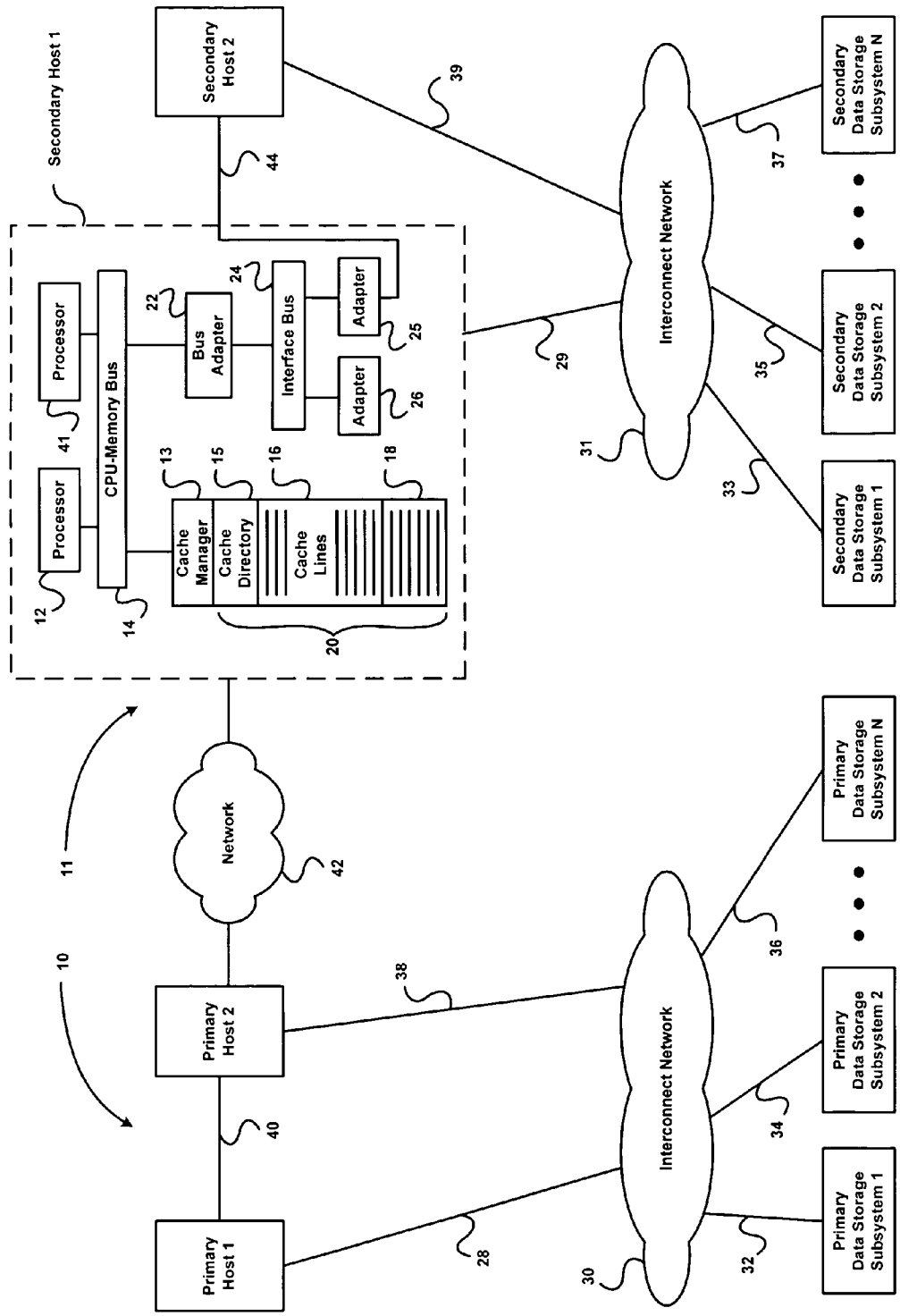
FIG. 1 illustrates an embodiment of a primary and a secondary data storage system.

FIG. 1 illustrates a primary data storage system 10 and a secondary data storage system 11 connected through a computer network 42. If the applications change data at the primary data storage system 10, the data replication system transmits the changes over the computer network 42 to the secondary data storage system 11. Each data storage system includes one or more hosts coupled to data storage subsystem(s). Each host is a computer that can connect to client(s), data storage subsystem(s), and other hosts. Each host provides software/hardware interfaces such as network interface cards and software drivers to implement Ethernet, Fibre Channel, ATM, SCSI, or InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, each host includes a motherboard with a CPU-memory bus 14 that communicates with dual processors 12 and 41. A processor could be a suitable general-purpose processor running software, an ASIC dedicated to perform the operations described herein, or a field programmable gate array (FPGA). The processor used is not essential to the invention and could be any suitable processor such as the Intel Pentium 4 processor. Also, one could implement the invention using a single processor in each host or more than two processors to meet more stringent performance requirements. The arrangement of the processors is not essential to the invention.

The cache memory 20 is nonvolatile memory, volatile memory, or a combination of both. A cache manager 13 manages the cache memory 20 of each host. The cache memory 20 includes a cache directory 15, volatile cache lines 16, and nonvolatile cache lines 18. The nonvolatile cache lines 18 protect data in the event of a power interruption or a host failure. Data is defined as including user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory.

Each host includes a bus adapter 22 between the CPU-memory bus 14 and an interface bus 24. Each host runs an operating system such as Linux, UNIX, a Windows OS or another suitable operating system. Tanenbaum, *Modern Operating Systems* (2001) describes operating systems in detail and is hereby incorporated by reference.

The secondary host 1 is representative of the other hosts, but it is not essential to the invention that the hosts be identical.

The secondary host 1 can communicate with the secondary host 2 through an interconnect 44, shown as connected to an adapter 25 to the interface bus 24. The PCI bus is one suitable interface bus and the interconnect 44 may be any suitable known bus, SAN, LAN, or WAN technology. In an embodiment, the interconnect 44 is a dedicated Fibre Channel (FC) point-to-point link that connects to FC-PCI bus adapter 25 to provide fast point-to-point communication between the hosts.

In an alternative embodiment, the interconnect network 31 such as a FC fabric provides extra bandwidth for host-to-host communications. In this embodiment, links 29 and 39 connect to the interconnect network 31 and the hosts use link 29 and link 39 when available. FC standard software can set priority levels to ensure high priority peer-to-peer requests, but there will still be some arbitration overhead and latency in claiming ownership of the links. For example, if links 29 and 39 are busy transferring data when a write request arrives, that operation must complete before either link is free for arbitration.

If the interconnect 44 ever fails, communication between hosts can be handled using the interconnect network 31. The interconnect network 31 can be implemented by interconnects used in data storage systems such as Fibre Channel, SCSI, InfiniBand, or Ethernet, and the type of interconnect is not essential to the invention. In either embodiment, redundant communication between hosts ensures the data storage system has high availability. See Clark, *Designing Storage Networks* (2003), Clark, *IP SANs: A Guide to iSCSI, iFCP, and FCIP Protocols for Storage Area Networks* (2002), and Clark, *Designing Storage Area Networks* (1999) which are incorporated herein by reference.

In an embodiment, the data storage subsystems shown in FIG. 1 can be those described in the U.S. patent application Ser. No. 10/677,560, entitled, Systems and Methods of Multiple Access Paths to Single Ported Storage Devices, filed on Oct. 1, 2003, and incorporated by reference herein. It is understood, however, that other storage device(s) or data storage subsystems could be used for the storage instead of the data storage subsystems described in that U.S. patent application.

As shown in FIG. 1, the secondary host 1 connects, or couples, to the secondary data storage subsystem 1 through the bus adapter 22, the interface bus 24, the adapter 26, the link 29, the interconnection network 31, and the link 33. To connect to the secondary data storage subsystem 2, the secondary host 1 uses the same I/O path except the data passes through link 35, while the secondary host 2 uses the same type of I/O path plus link 33 to communicate with the secondary data storage subsystem 1, link 35 to communicate with the secondary data storage subsystem 2, or link 37 to the secondary data storage subsystem N.

Figure 2:
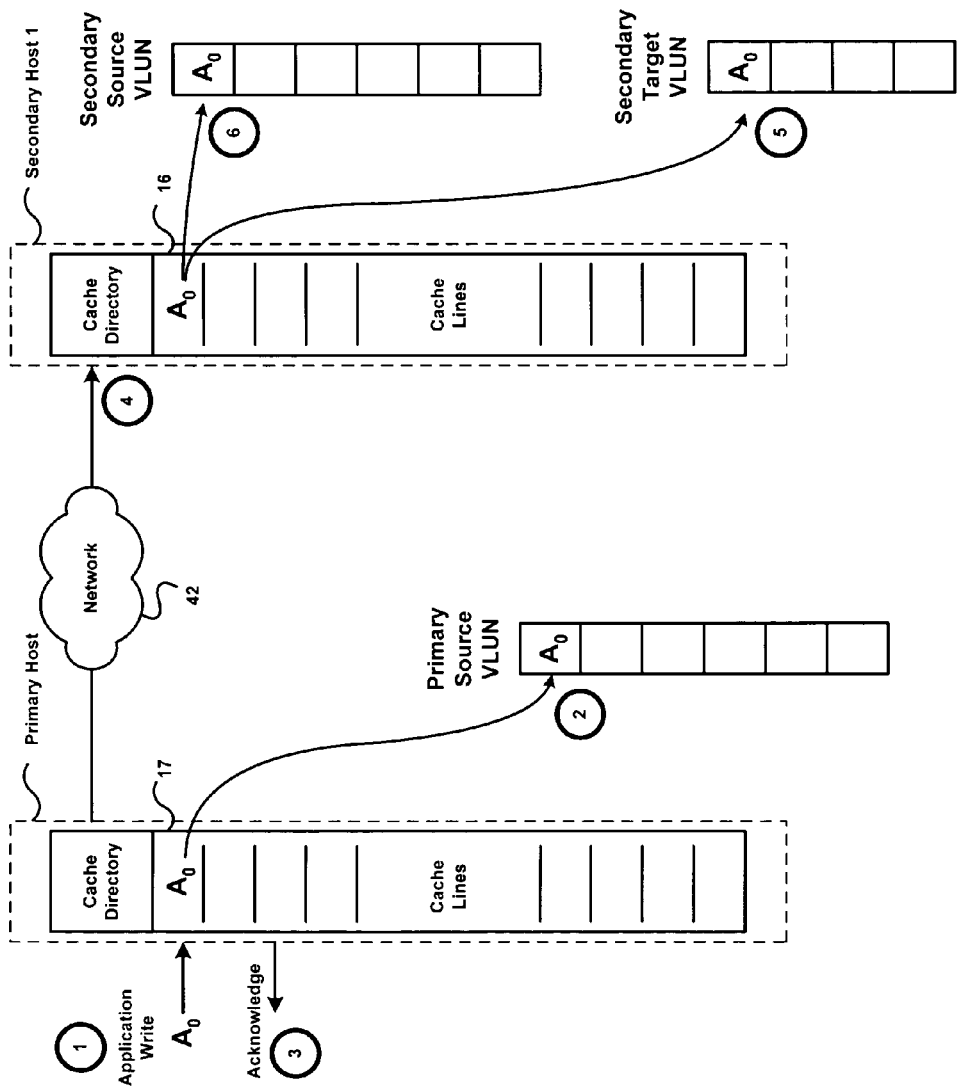
FIG. 2 illustrates how a write to a block is replicated from the primary to the secondary data storage systems.

FIG. 2 illustrates how a write to a data block is replicated from the primary to the secondary data storage systems. At step 1, an application sends a write command for a first block, say $A_0$, to the primary host. The primary host receives the write command and stores the first block $A_0$ in the cache lines 17. The block may be an individual data block (e.g., 512 bytes) or a plurality of blocks say, 1K to 8K or more. An application is program code that reads and writes data that is stored in the data storage system. At step 2, the primary host writes the first block $A_0$ to the primary source VLUN. At step 3, the primary host acknowledges that the write of the first block $A_0$ has occurred to the application. At step 4, the primary host transmits the first block $A_0$ to the secondary host 1 over the network 42. At step 5, the secondary host 1 writes the first block $A_0$ from cache lines 16 to a secondary target VLUN. For additional blocks, the primary host and the secondary host 1 repeat steps 1–5 for each block. At step 6, when the secondary host 1 has received all of the blocks of a data set, the secondary host 1 writes the blocks of the data set to the secondary source VLUN.

Figure 3:
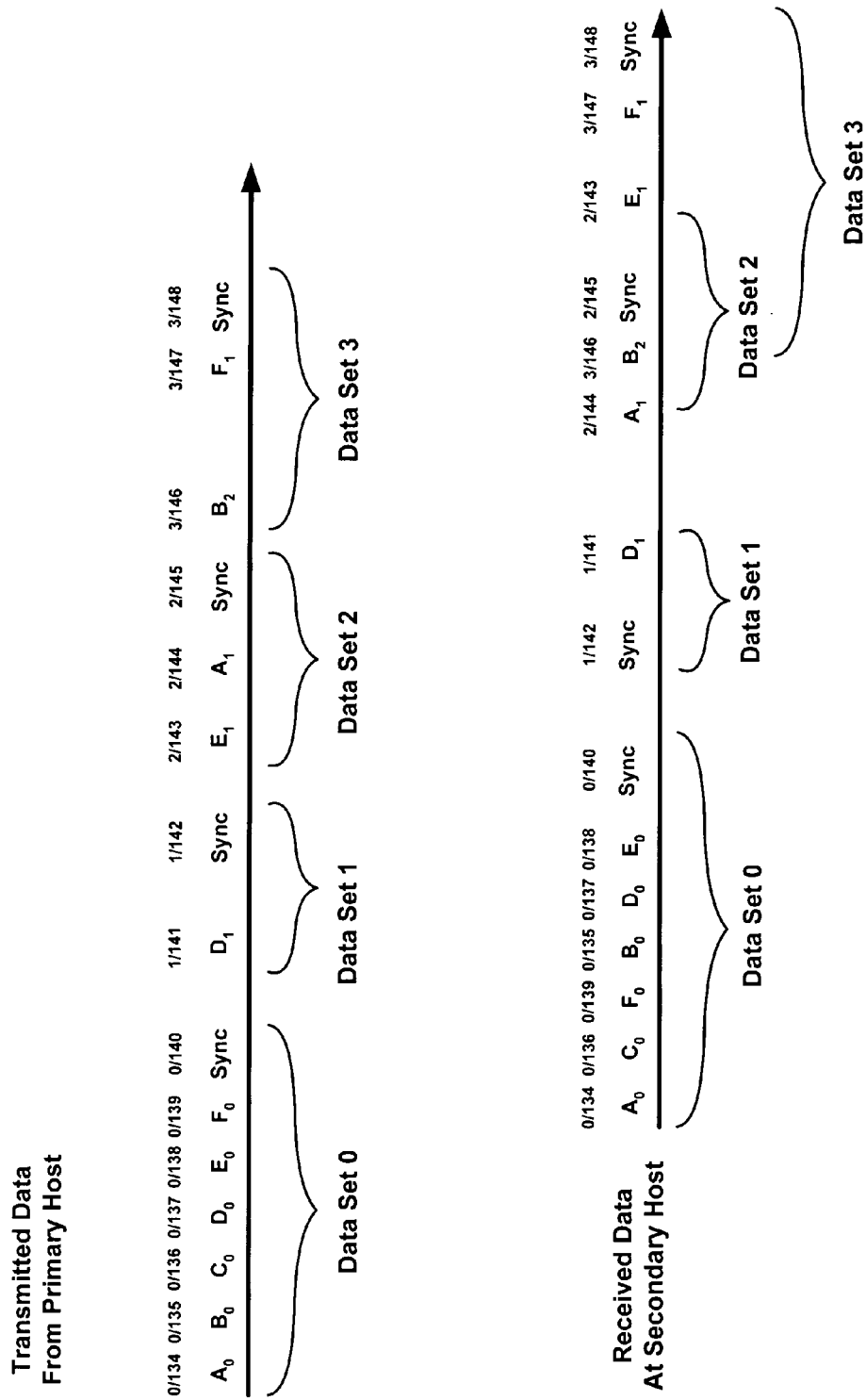
FIG. 3 illustrates transmitting data from the primary host and receiving data out-of-order at the secondary host.

FIG. 3 illustrates replicating data sets from the primary host to the secondary host. The primary host transmits a data set 0 consisting of write commands for blocks $A_0$, $B_0$, $C_0$, $D_0$, $E_0$, and $F_0$ and a sync command on the network 42 (FIG. 1) to the secondary host. Each of the write and sync commands has a data set ID and a sequence number. For example, the write command for block $A_0$ is assigned 0/134 to indicate data set 0 and sequence number 134. In order to keep the network busy, the primary host transmits the write commands without waiting for the data set to be complete. Thus, the write commands are transmitted independently from the data set in this regard. The table below illustrates data set 0:

| Command Type | Block | Data Set ID | Sequence Number |
|---|---|---|---|
| Write | $A_0$ | 0 | 134 |
| Write | $B_0$ | 0 | 135 |
| Write | $C_0$ | 0 | 136 |
| Write | $D_0$ | 0 | 137 |
| Write | $E_0$ | 0 | 138 |
| Write | $F_0$ | 0 | 139 |
| Sync | | 0 | 140 |

The primary host assigns a data set ID to indicate all of the writes that belong to the same data set and a sequence number that shows the sending order.

The next transmission is data set 1 which has only one write command as shown in the table below:

| Command Type | Block | Data Set ID | Sequence Number |
|---|---|---|---|
| Write | $D_1$ | 1 | 141 |
| Sync | | 1 | 142 |

Data sets 2 and 3 illustrate further write and sync commands:

| Command Type | Block | Data Set ID | Sequence Number |
|---|---|---|---|
| Write | $E_1$ | 2 | 143 |
| Write | $A_1$ | 2 | 144 |
| Sync | | 2 | 145 |
| Write | $B_2$ | 3 | 146 |
| Write | $F_1$ | 3 | 147 |
| Sync | | 3 | 148 |

FIG. 3 illustrates that the network 42 did not maintain the blocks in order so that the secondary host receives the blocks out-of-order. Thus, the blocks that the primary host sent as $A_0$, $B_0$, $C_0$, $D_0$, $E_0$, and $F_0$ are received as $A_0$, $C_0$, $F_0$, $B_0$, $D_0$, and $E_0$ at the secondary host.

The following table describes the receipt of the blocks at the secondary host.

| Command | Block | Data Set ID | Sequence | Comments |
|---|---|---|---|---|
| Write | $A_0$ | 0 | 134 | |
| Write | $C_0$ | 0 | 136 | |
| Write | $F_0$ | 0 | 139 | |
| Write | $B_0$ | 0 | 135 | |
| Write | $D_0$ | 0 | 137 | |
| Write | $E_0$ | 0 | 138 | |
| Sync | | 0 | 140 | Completes data set 0 |
| Sync | | 1 | 142 | |
| Write | $D_1$ | 1 | 141 | Completes data set 1 |
| Write | $A_1$ | 2 | 144 | |
| Write | $B_2$ | 3 | 146 | |
| Sync | | 2 | 145 | |
| Write | $E_1$ | 2 | 143 | Completes data set 2 |
| Write | $F_1$ | 3 | 147 | |
| Sync | | 3 | 148 | Completes data set 3 |

The primary host transmits another write to a block in the same data set after the primary host receives an acknowledgement for a prior update to the same block. This ensures that writes to the same block are in order.

In an embodiment, the primary host can store multiple writes to transmitted blocks without over-writing them while waiting for an acknowledgement from the secondary host. A method and system for storing multiple writes is described in U.S. patent application Ser. No. 10/440,347, entitled, Methods and Systems of Cache Memory Management and Snapshot Operations, filed on May 16, 2003, and incorporated by reference herein. It is understood, however, that other cache memory management methods and systems could be used instead of those described in that U.S. patent application.

Figure 4:
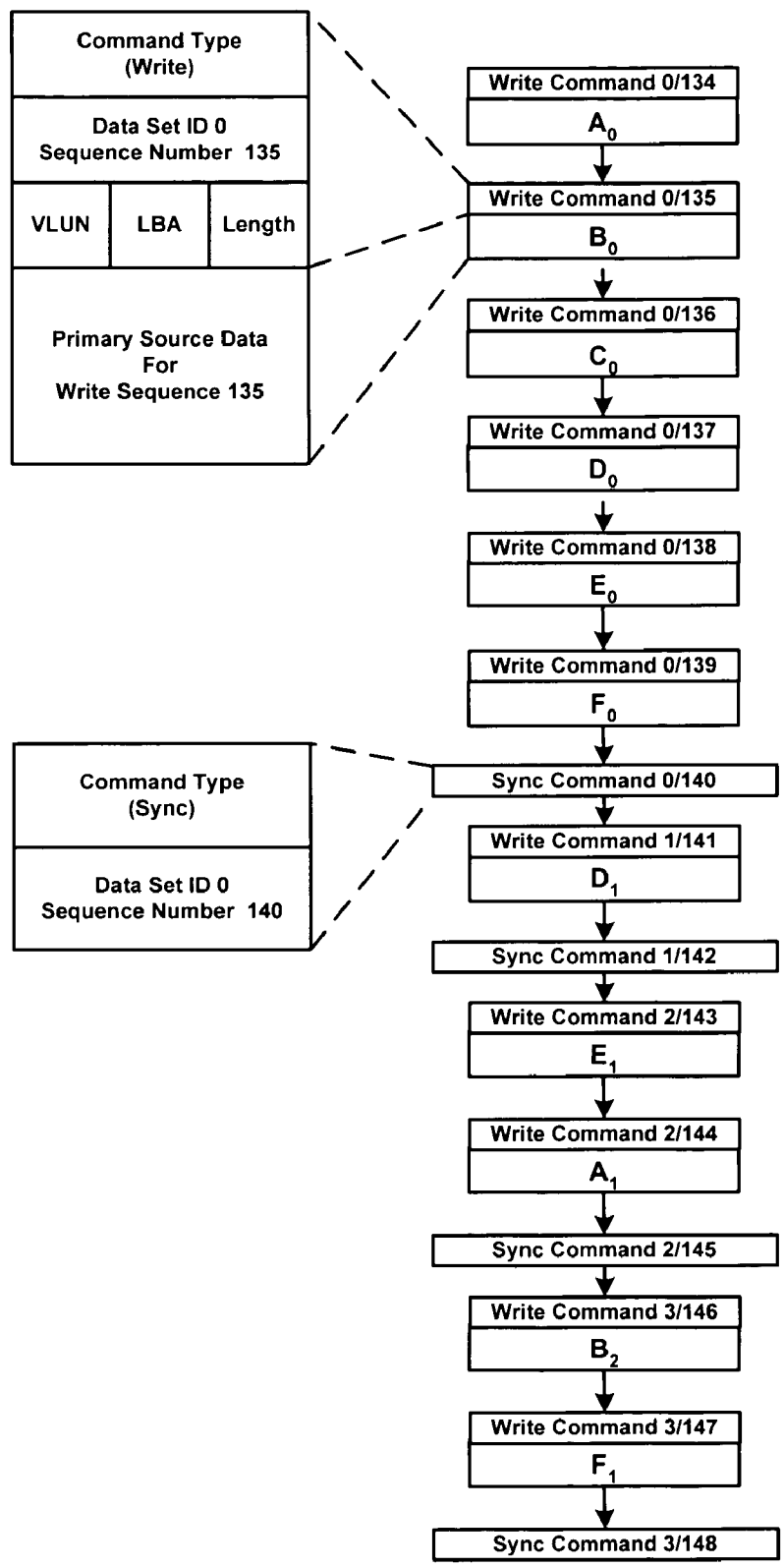
FIG. 4 illustrates the details of write and sync commands.

FIG. 4 illustrates the content of the write and sync commands transmitted over the network.

Each write command includes elements as defined below:

Data Set ID: A number identifying blocks sent between sync commands.

Sequence Number: A number that indicates the order in which the primary host sent the commands. This number should be large enough to ensure the sequence numbers can be reused without overlapping later data transmissions.

VLUN: The virtual logical unit number where the block is stored in the primary data storage system.

LBA: A unique logical block address that identifies each fixed-sized block.

Length: The size of the block.

Data: The block associated with the write command.

Each sync command includes:

Data set ID: A number associated with the write commands sent within the same data set.

Sequence number: A number that is the final sequence number in the data set. This number and the previous sync command sequence number bound the sequence numbers for each data set.

Figure 5:
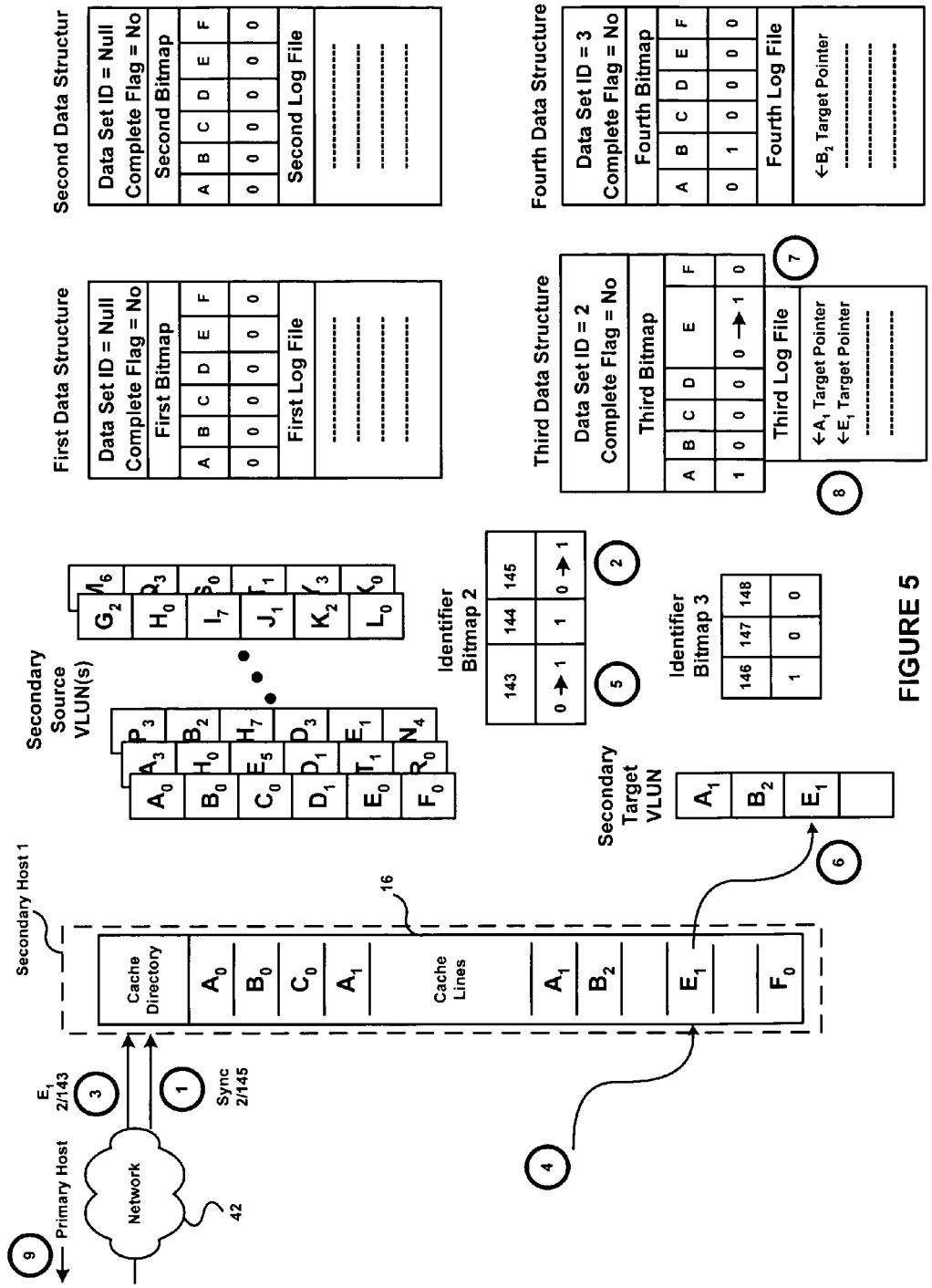
FIG. 5 illustrates processing of sync and write commands at the secondary data storage system.
Figure 6:
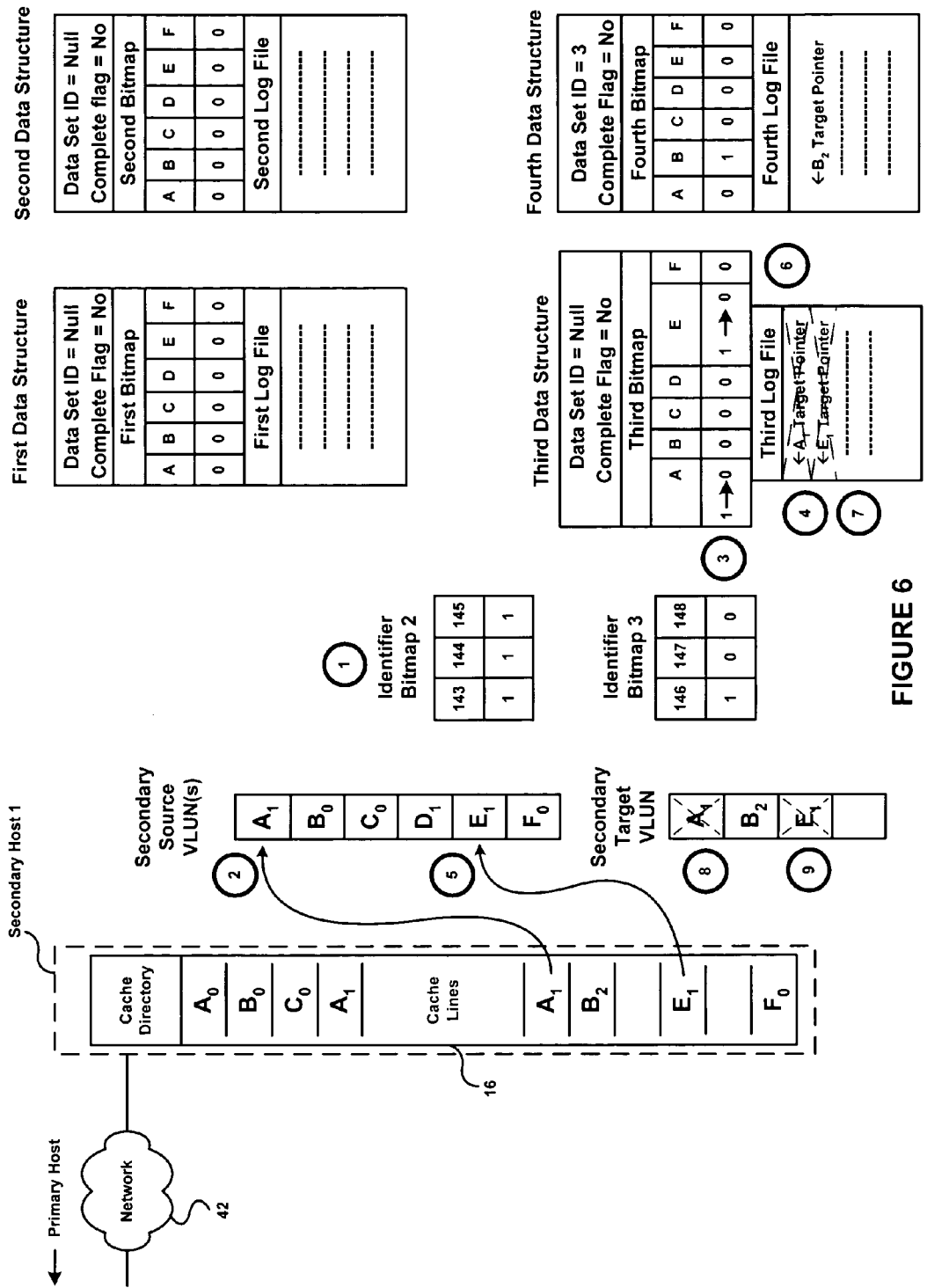
FIG. 6 illustrates receiving a complete data set and writing the data set to a secondary source VLUN.

FIGS. 5–6 illustrate how the secondary host processes the write and sync commands at the secondary data storage system. As shown in FIG. 5, the secondary data storage system includes a source VLUN and a target VLUN. The secondary source VLUN holds a copy of the blocks transmitted from the primary data storage system while the secondary target VLUN holds copies of blocks until they can be written to the secondary source VLUN.

Each VLUN (virtual logical unit) in the primary or secondary data storage system is an abstraction of storage device(s). Users of a VLUN see it as a linear array of fixed-size blocks. A unique logical block address (LBA) identifies each fixed-sized block. The system constructs a VLUN from all or portions of several physical storage devices such as disk drives. To create a large VLUN, the system concatenates space allocated from several storage devices. To improve performance, the system maps adjacent regions of VLUN space onto different physical storage devices (striping). To improve reliability, the system holds multiple copies of a VLUN on different storage devices (mirroring).

The secondary data storage system includes a set of data structures that keep track of pending writes to blocks. Each data structure associated with a data set uses a bitmap to indicate which blocks for the data set have been written to the secondary target VLUN and a log file to indicate the location of the blocks in the secondary target VLUN. Each data structure also includes the current data set ID and a complete flag indicating whether or not the data structure points to a complete set of blocks pertaining to the data set.

Figure 13:
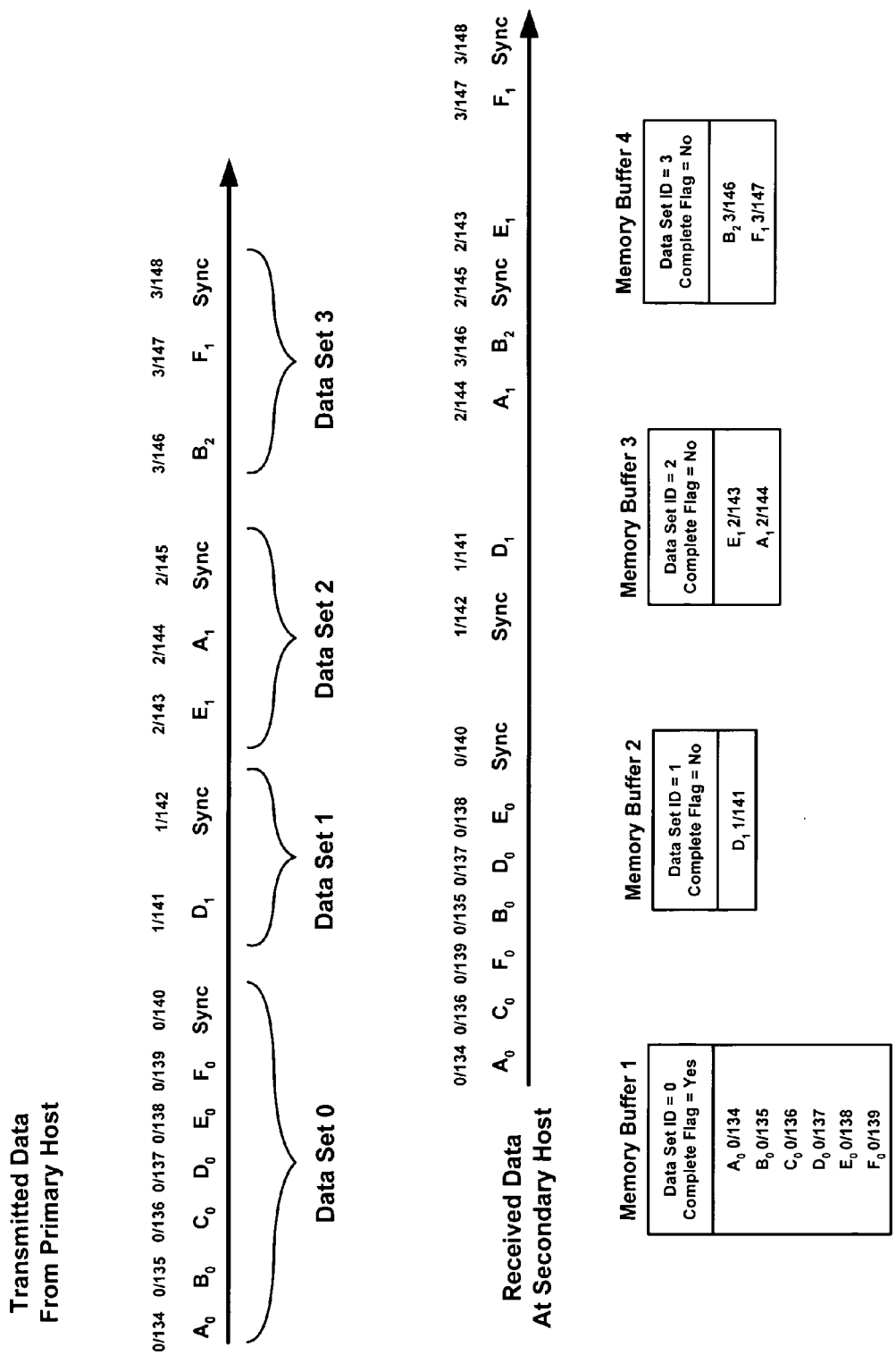
FIG. 13 illustrates data replication using memory buffers.

The secondary data storage system stores the data structures in persistent memory (e.g., the nonvolatile memory 18 or the secondary data storage subsystem 1 shown in FIG. 1) so that the data structure can be read in the event of a power failure or a system crash. Other well known data structures can be used as long as they allow the secondary host to store and retrieve blocks and their addresses, show the data set ID for the data structure, indicate whether the data structure references a complete data set, and survive power failures and system crashes. Cormen et al., *Introduction to Algorithms, Second Edition* (2001) describes data structures in detail and is hereby incorporate by reference herein. In an alternative embodiment, a memory buffer replaces the data structure and the target VLUN as depicted in FIG. 13.

FIG. 5 illustrates processing of sync and write commands at the secondary data storage system. At step 1, the secondary host receives a sync command with data set ID 2 and with sequence number 145. At step 2, the secondary host sets the bit from 0 to 1 for this sync command in the identifier bitmap 2 to indicate receipt. At step 3, the secondary host receives a write command for block $E_1$ with data set ID 2 and sequence number 143. At step 4, the secondary host writes block $E_1$ to cache lines 16. At step 5, the secondary host sets the identifier bitmap 2 to indicate receipt of the write command. At step 6, the secondary host writes block $E_1$ to the target VLUN. At step 7, the secondary host sets the bitmap in the third data structure. At step 8, the secondary host adds a target pointer for $E_1$ in the third log file. At step 9, the secondary host sends an acknowledgement of the write command for $E_1$ to the primary host.

FIG. 6 illustrates receiving a complete data set and writing the data set to a secondary source VLUN. At step 1 the secondary host reads identifier bitmap 2 and verifies it has received the data set 2. The secondary host can now write the blocks of data set 2 to the secondary source VLUN. At step 2, the secondary host writes block $A_1$ to the secondary source VLUN. The secondary host clears the bit in the third bitmap corresponding to block A at step 3 and clears the entry in the third log file for $A_1$ at step 4. At step 5, the secondary host writes block $E_1$ to the secondary source VLUN. The secondary host clears the bit in the third bitmap corresponding to block E at step 6 and the entry in the third log file for $E_1$ at step 7. At steps 8 and 9, the secondary host deallocates the space in the secondary target VLUN occupied by blocks $A_1$ and $E_1$. By tracking the write commands in the data structures and identifier bitmaps, the secondary host can receive write commands belonging to data sets that overlap each other.

Figure 7:
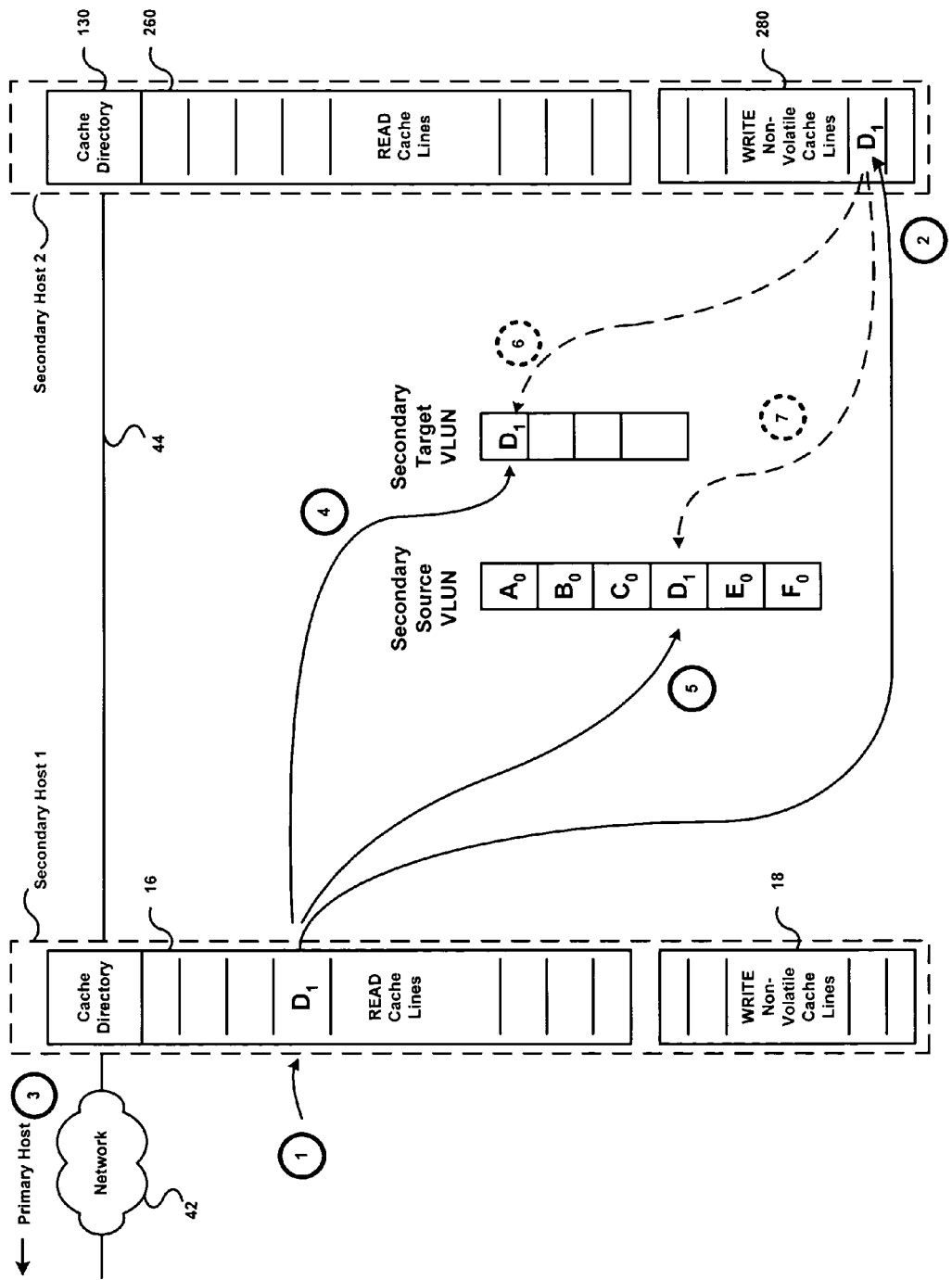
FIG. 7 illustrates cache memory management at the secondary data storage system.

FIG. 7 illustrates an embodiment using a write back cache method of memory management at the secondary data storage system having secondary hosts 1 and 2. At step 1, a block $D_1$ is written to volatile cache lines 16 of the secondary host 1. At step 2, the secondary host 1 writes a copy of block $D_1$ to the non-volatile cache lines 280 of the secondary host 2. At step 3, the secondary host 1 notifies the primary host that the block $D_1$ has been safely stored. At step 4, the secondary host 1 writes the block $D_1$ to the secondary target VLUN. The secondary host 1 will write block $D_1$ to the secondary source VLUN when the entire data set that it belongs to is received.

The copy of block $D_1$ in the non-volatile cache lines 280 permits the secondary data storage system to address failure of the secondary host 1 or loss of system power. If the secondary host 1 fails before step 4, the secondary host 2 writes block $D_1$ to the secondary target VLUN at step 6 and to the secondary source VLUN at step 7. If the system loses power before step 4, the secondary host 2 uses the copy of block $D_1$ in the non-volatile cache lines 280 to write block $D_1$ to the secondary target VLUN at step 6 and to the secondary source VLUN at step 7. Similarly if secondary host 1 fails before step 5, the secondary host 2 writes block $D_1$ to the secondary source VLUN at step 7. If the system loses power before step 5, the secondary host 2 uses the copy of block $D_1$ in non-volatile cache lines 280 to write block $D_1$ to the secondary source VLUN at step 7.

Figure 8:
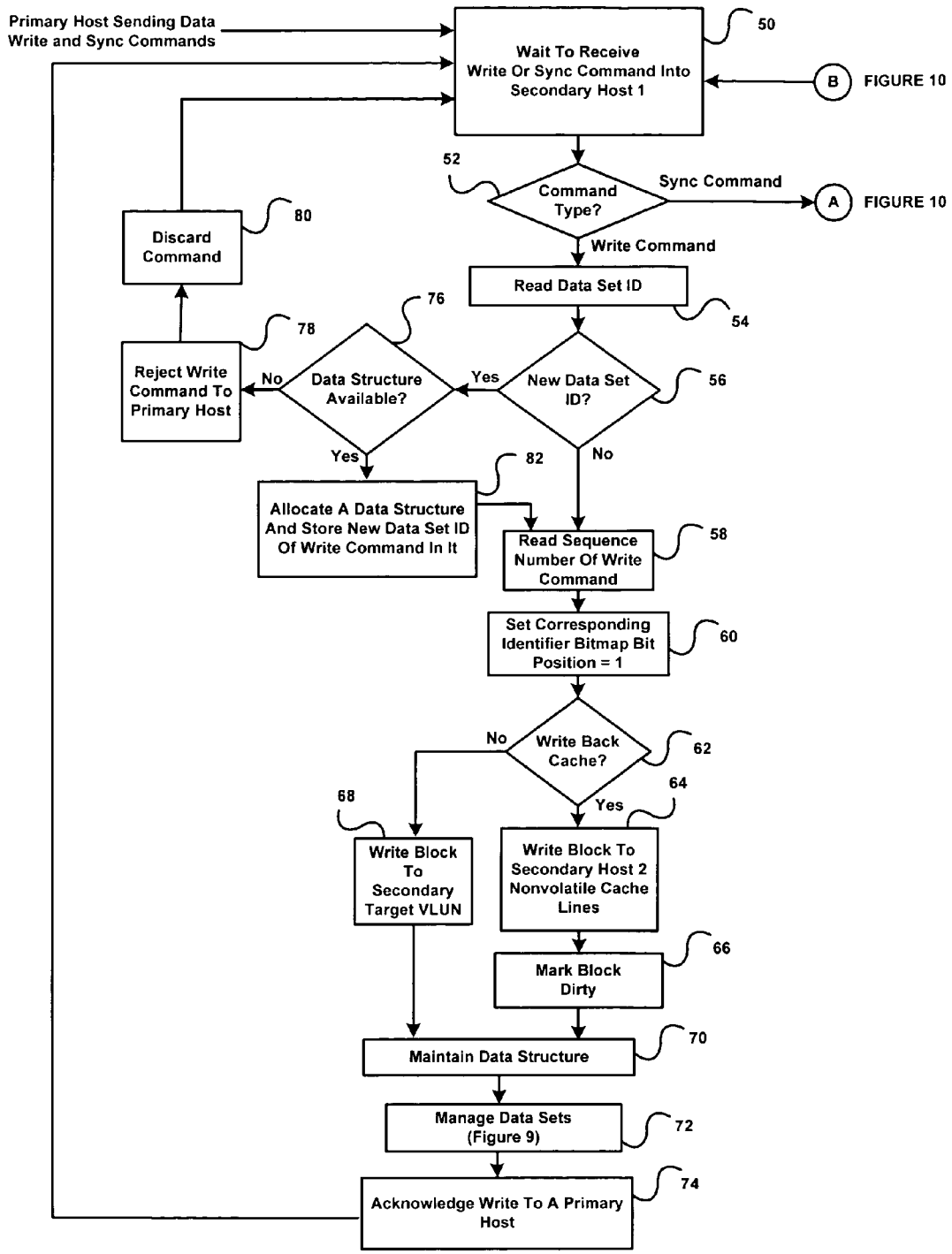
FIG. 8 illustrates the processing of write commands.

FIG. 8 illustrates the processing of write commands at the secondary data storage system. Referring to FIG. 8, the method begins with the secondary host 1 waiting for a write or sync command from the primary host at step 50. Once received, the secondary host 1 determines the command type at step 52. If it is a write command, the secondary host 1 reads the data set ID at step 54 and checks if it is new at step 56. If it is new, the secondary host 1 checks for availability of a data structure at step 76. If no data structures are available, the secondary host 1 rejects the write command at step 78, discards the write command at step 80, and waits for the next command at step 50. If a new data structure is available at step 76, the secondary host 1 allocates the new data structure and stores the data set ID of the write command in the data structure at step 82. Regardless of whether the data set ID is new or not, the method goes to step 58 where the secondary host 1 reads the sequence number and at step 60 sets the identifier bitmap bit position from 0 to 1. At step 62, the secondary host 1 determines if the secondary data storage system is in write back cache mode.

If in write back cache mode, the secondary host 2 writes the block to the nonvolatile cache lines 280 (FIG. 7) of the secondary host 2 at step 64. At step 66, the secondary host 2 marks the block dirty in the nonvolatile cache lines 280 of the secondary host 1 to indicate the block can be destaged to the secondary target VLUN.

If not in write back cache mode, the secondary host 1 writes the block to the secondary target VLUN at step 68. At step 70, the secondary host 1 maintains the data structure to indicate the block is present in the data structure and where to find it. FIG. 4 shows that maintaining the data structure includes the steps of setting the bitmap and updating the log file to point to the location of the block in the secondary target VLUN. At step 72, the secondary host 1 manages the data sets as described in FIG. 9. At step 74, the secondary host 1 acknowledges the write to a primary host and returns to step 50 to wait for the next command.

Figure 9:
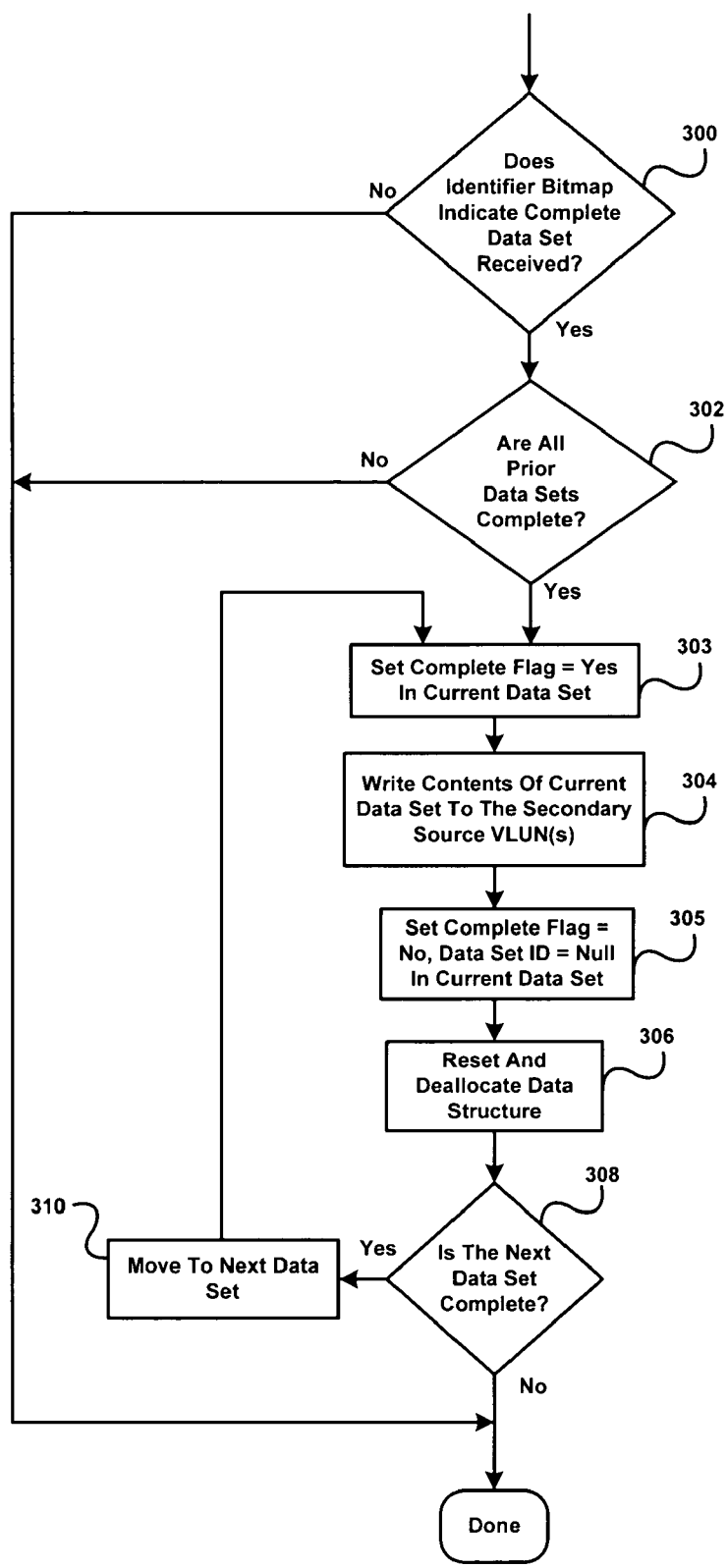
FIG. 9 illustrates the managing of data sets.
Figure 10:
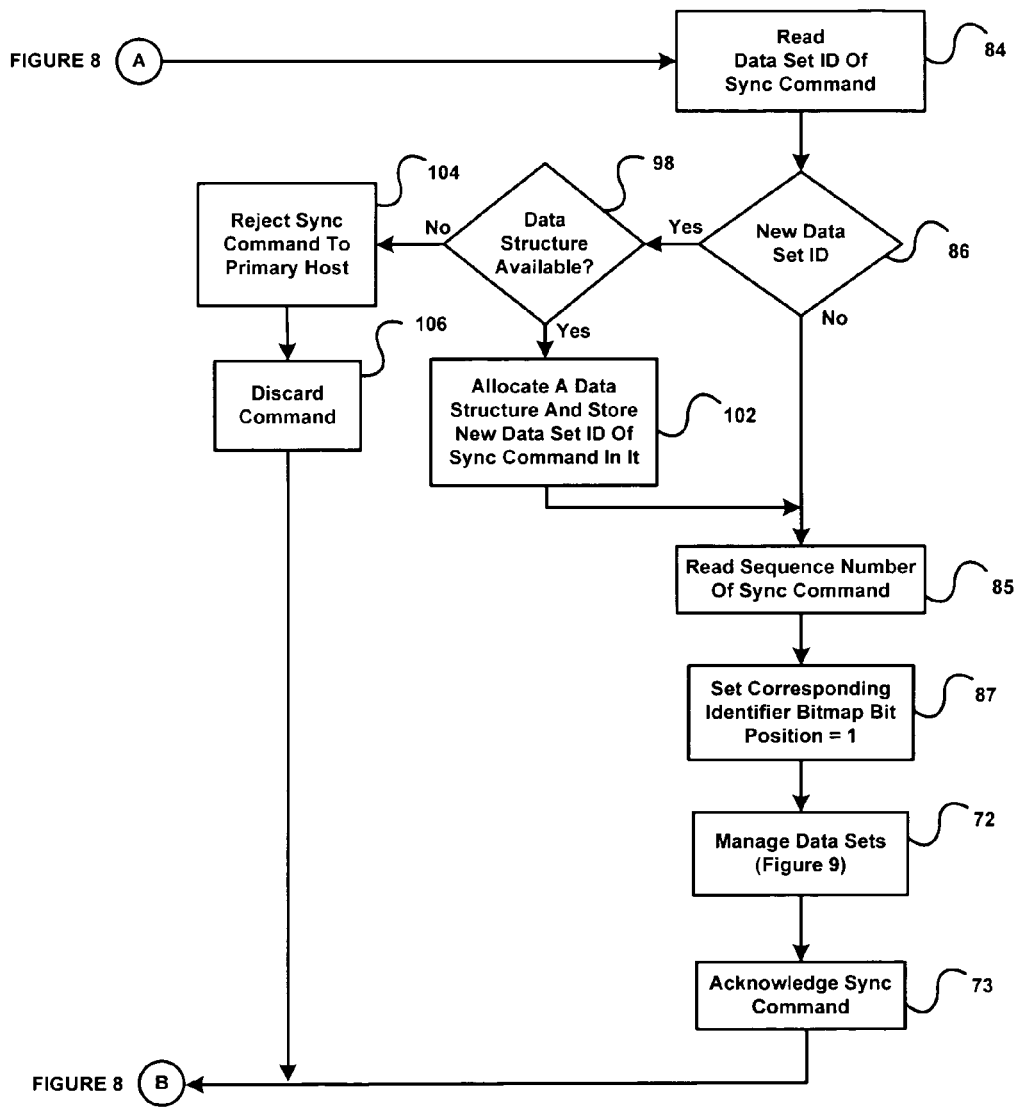
FIG. 10 illustrates the processing of sync commands.

FIG. 9 illustrates the managing of data sets at step 72 in FIG. 8 or FIG. 10. Referring to FIG. 9, at step 300 the secondary host 1 checks if the identifier bitmap indicates receipt of a complete data set. If the data set is incomplete, the method is done. If complete, at step 302 the secondary host 1 checks if all prior data sets are complete. If they are not all complete, the method is done. If the prior data sets are all complete, the secondary host 1 sets the complete flag=yes in the current data set at step 303 and writes the contents of the current data set to the secondary source VLUN(s) at step 304. At step 305, the secondary host 1 sets the complete flag=no and sets data set ID=null in the current data set. Next, the secondary host 1 resets and deallocates the current data structure at step 306. At step 308, the secondary host 1 checks if the next data set is complete, and if not, the method is done. If the next data set is complete, the secondary host 1 moves to the next data set at step 310 and repeats the method just described beginning at step 303.

FIG. 10 illustrates further processing of a sync command identified at step 52 (FIG. 8). At step 84, the secondary host 1 reads the data set ID of the sync command and checks if it is new at step 86. If it is new, the secondary host 1 checks for availability of a new data structure at step 98. If a data structure is not available, the secondary host 1 rejects the sync command at step 104, discards the sync command at step 106 and awaits the next command at step 50 (FIG. 8). If a new data structure is available at step 98, the secondary host 1 allocates the new data structure and stores the data set ID of the sync command in the data structure at step 102. Regardless of whether or not the data set ID is new, the secondary host 1 reads the sequence number of the sync command at step 85 and sets the corresponding identifier bitmap bit position from 0 to 1 at step 87. At step 72, the secondary host 1 manages the data sets as described above and shown in FIG. 9. At step 73, the secondary host 1 acknowledges to the primary host that the processing of the sync command is complete and returns to step 50 (FIG. 8) to wait for the next command.

If the primary host fails (e.g., due to a power loss), the secondary host writes all of the data sets that were completely received to the secondary source VLUN. In contrast, the secondary host erases any partially received data sets from the secondary target VLUN and the data structure(s) since the partially received data sets are unreliable. The secondary source VLUN contains a consistent copy of the primary source VLUN up to the last complete data set received at the secondary host. Thus, applications that were running at the primary host can now run at the secondary host using the data in the secondary source VLUN.

Figure 11:
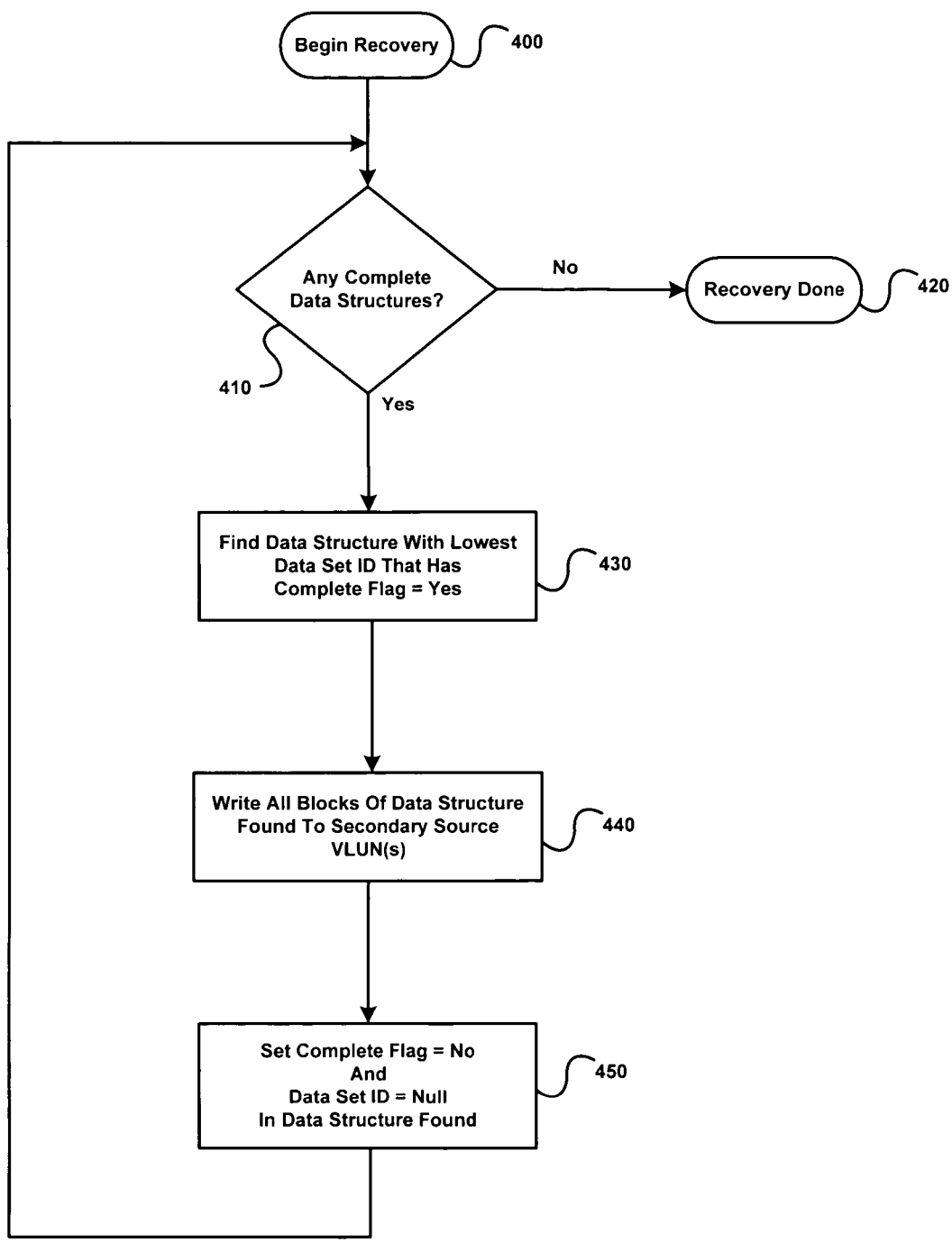
FIG. 11 illustrates data recovery from a failure at a secondary host.

If the secondary host fails (e.g., due to a power loss), it runs a method illustrated in FIG. 11 after it resumes operation to complete the processing of steps 304 through 310 of FIG. 9. Referring to FIG. 11, at step 400 the secondary host begins a recovery method. At step 410, the secondary host checks whether there are any data structures marked with complete flag=yes. If not, the secondary host has completed recovery at step 420. Otherwise, the method goes to step 430 where the secondary host finds the data structure that has the lowest data set ID and is marked with complete flag=yes. At step 440, the secondary host writes all blocks of the data structure found at step 430 to the secondary source VLUN (s). At step 450, the secondary host updates the data structure found by setting the complete flag=no and the data set ID=null to indicate that the blocks of the data set have been written to the storage. The secondary host then returns to step 410 to check for any additional complete data sets to write to the secondary source VLUN(s).

Figure 12:
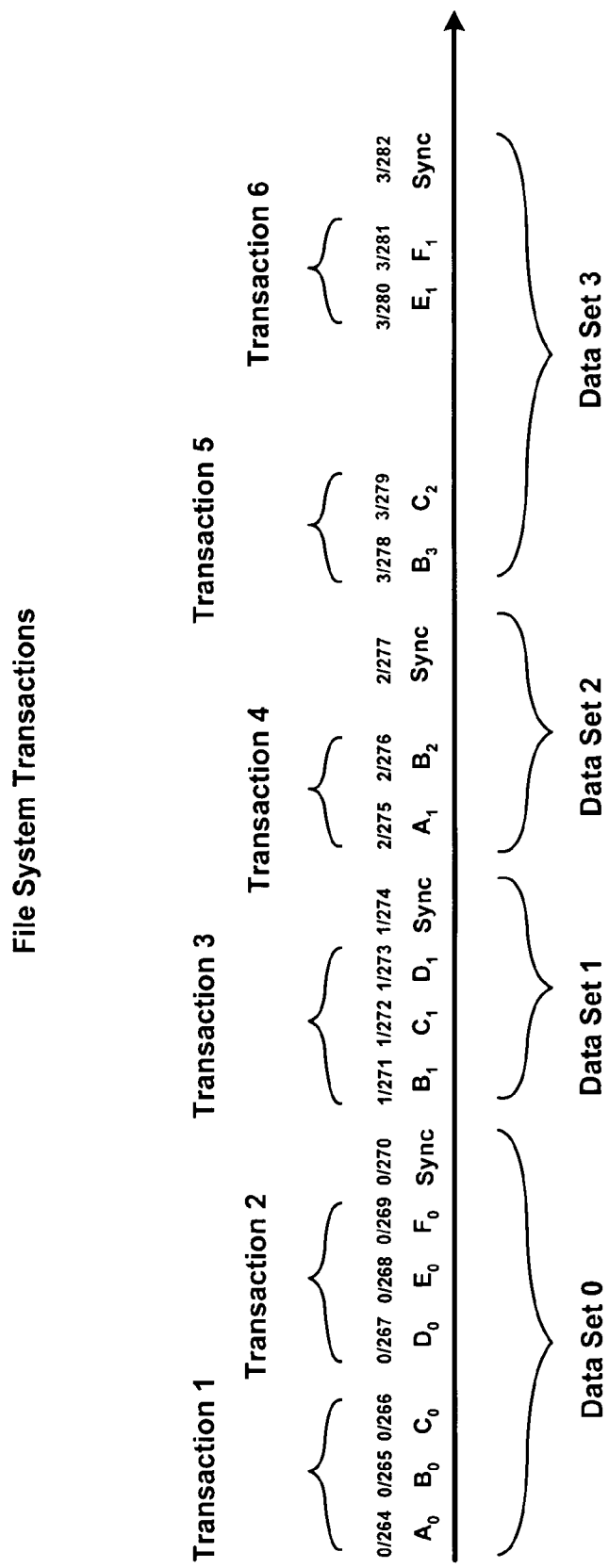
FIG. 12 illustrates mapping file system transactions to data sets.

FIG. 12 illustrates the mapping of file system transactions into data sets. As shown, a data set can contain one or more file system transactions such as transactions 1 and 2. A file system transaction such as transaction 1 includes a set of block writes (i.e., $A_0$, $B_0$, and $C_0$) that implement an operation such as creating a file, renaming a file, or writing to a file. In order to maintain file system consistency, the set of block writes making up a given transaction should either happen in their entirety or not at all. Otherwise, the files and/or the file directories can be corrupted and unreliable. As described earlier, the system replicates whole data sets such as the data sets having the sequence numbers 264–270, 271–274, 275–277, and 278–282. By placing a sync command between adjacent file system transactions, such as sync command 270 between transactions 2 and 3, the secondary source VLUN contains a valid and consistent file system.

FIG. 13 illustrates memory buffers that provide an alternative to the data structures and the secondary target VLUN described earlier. The secondary host 1 receives write and sync commands as previously described, but keeps the lists of updates in a sequential log format in memory buffers. Each memory buffer corresponds to a single data set and has the data set ID and complete flag. As the secondary host 1 receives each block, it writes the block, the sequence number, LBA, and block length into the memory buffer corresponding to the data set ID in the write command. In write back mode, the secondary host 1 writes a copy of the list entry to the non-volatile memory 280 (FIG. 7) of the secondary host 2. In write through mode, the secondary host 1 writes the list entry sequentially to a journal VLUN that corresponds to the data set ID. The secondary host 1 allocates a journal VLUN for each active data set to store the write commands of data sets not yet destaged. When the secondary host 1 has made a block persistent, it acknowledges the write to the primary host. When the secondary host 1 receives all the blocks for a data set as determined by the identifier bit map, it sets the complete flag=yes and destages them to the secondary source VLUN by writing them from cache memory 20 (FIG. 7). As in the data structure case, the secondary host 1 must write data sets in ascending order.

What is claimed:

1. A method of asynchronous data replication over a network, wherein one or more applications send write commands to a primary host, comprising:

at the primary host:
  acknowledging each write command before transmitting the write command to a secondary host;
  assigning a data set ID to each write command;
  transmitting each write command before the application has sent all of the write commands of the data set to the primary host;
  assigning the data set ID to a sync command;
  transmitting the sync command, wherein the write commands and the sync command define the data set;
at the secondary host:
  receiving the write commands and sync command out of order; and
  writing the data set to a storage coupled to the secondary host.

2. The method of claim 1, further comprising tracking the receipt of the write and sync commands at the secondary host.

3. The method of claim 2, further comprising assigning a unique sequence number for each write command and another sequence number to the sync command at the primary host.

4. The method of claim 3, wherein tracking the receipt of the write and sync commands includes setting bits in an identifier bitmap corresponding to the data set at the secondary host.

5. The method of claim 4, further comprising using the identifier bitmap to determine receipt of the data set at the secondary host.

6. The method of claim 1, further comprising writing a block of the data set to a secondary target VLUN and acknowledging the write and sync commands before receipt of the data set at the secondary host.

7. The method of claim 5, further comprising updating a data structure at the secondary host to track blocks of the data set in the secondary target VLUN.

8. The method of claim 7, wherein updating the data structure at the secondary host includes setting bits in a bitmap and updating a log file.

9. The method of claim 1, further comprising storing multiple versions of one of the blocks of the data set at the primary host while waiting for an acknowledgement from the secondary host.

10. The method of claim 1, further comprising writing blocks of the data set to a memory buffer at the secondary host and acknowledging the write and sync commands at the secondary host before receipt of the data set.

11. The method of claim 1, wherein the step of receiving at the secondary host includes receiving write commands belonging to a plurality of data sets that are overlapping with respect to each other.

12. The method of claim 11, further comprising storing the data sets in a plurality of data structures.

13. The method of claim 1, further comprising receiving a second data set at the secondary host, wherein the step of receiving write commands for the second data set precedes receiving the write commands of the data set.

14. The method of claim 1, further comprising transmitting the write and sync commands on the network using the Fibre channel protocol.

15. The method of claim 1, further comprising transmitting the write and sync commands on the network using the iSCSI protocol.

16. The method of claim 1, wherein the step of writing includes the secondary host writing the blocks of the data set to a secondary source VLUN.

17. The method of claim 1, wherein the data set contains one or more file system transactions.

* * * * *